US009673975B1

(12) United States Patent
Machani

(10) Patent No.: US 9,673,975 B1
(45) Date of Patent: Jun. 6, 2017

(54) CRYPTOGRAPHIC KEY SPLITTING FOR OFFLINE AND ONLINE DATA PROTECTION

(71) Applicant: EMC Corporation, Hopkinton, MA (US)

(72) Inventor: Salah Machani, Toronto (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 117 days.

(21) Appl. No.: 14/752,519

(22) Filed: Jun. 26, 2015

(51) Int. Cl.
  *H04L 9/08* (2006.01)
  *H04L 9/16* (2006.01)
(52) U.S. Cl.
  CPC .............. *H04L 9/0822* (2013.01); *H04L 9/16* (2013.01); *H04L 2209/24* (2013.01)
(58) Field of Classification Search
  CPC ...... H04L 9/0822; H04L 9/16; H04L 2209/24
  See application file for complete search history.

(56) References Cited

U.S. PATENT DOCUMENTS

| 8,184,813 | B2 | 5/2012 | Kaji | |
| 8,634,553 | B2* | 1/2014 | Hata | H04L 9/0836 380/255 |
| 8,855,318 | B1* | 10/2014 | Patnala | H04L 9/0822 380/277 |
| 2005/0086471 | A1 | 4/2005 | Spencer | |
| 2010/0020966 | A1* | 1/2010 | Hata | H04L 9/088 380/44 |

OTHER PUBLICATIONS

J. Schaad; "Advanced Encryption Standard (AES) Key WRAAP Algorithm"; Sep. 2002; <https://tools.ietf.org/rfc/rfc3394>; downloaded Jul. 2015; 39 pages.
"AES Key Wrap Specification"; Nov. 2001; 23 pages.
B. Kaliski; "Password-Based Cryptogaphy Specification"; Version 2.0; Sep. 2000; <https://www.ietf.org/rfc/rfc2898>; downloaded Jul. 2015; 32 pages.
Adi Shamir; "How to Share a Secret"; Massachusetts Institute of Technology; Nov. 1979; vol. 22; No. 11; pp. 612-613.

* cited by examiner

*Primary Examiner* — Brandon Hoffman
*Assistant Examiner* — Wasika Nipa
(74) *Attorney, Agent, or Firm* — BainwoodHuang

(57) ABSTRACT

Encrypting data using a private key, and encrypting the private key by generating a first encrypted version of the private key using a first master key, and generating a second encrypted version of the private key using a second master key. The first master key is split into shares including a user input key share derived from user authentication data, and the second master key is split into shares including a remote key share stored on a remote server. Data access when the device is offline is provided by reconstructing the first master key using the user input key share, in order to decrypt the first encrypted version of the private key. Data access when the device is online is provided by reconstructing the second master key using the remote key share, in order to decrypt the second encrypted version of the private key.

17 Claims, 11 Drawing Sheets

CRYPTOGRAPHIC KEY SPLITTING FOR OFFLINE AND ONLINE DATA PROTECTION

BACKGROUND

As it is generally known, a cryptographic key (or simply "key") is used by an encryption circuit or logic to determine how input data is to be encrypted and/or decrypted. For example, a key may specify a particular transformation to be performed on input data during encryption, and/or the reverse process during decryption. Keys may also be used in other types of cryptographic operations, such as generating digital signatures, and/or message authentication.

Both asymmetric cryptography and symmetric cryptography make use of cryptographic keys. Asymmetric cryptography, also known as public-key cryptography, employs key pairs, each of which is made up of two separate but related keys, i.e. a public key and a private key. While the private key must be maintained as a secret by the entity to which the key pair is assigned, the public key is made public. In public-key cryptography, data encrypted using a public key of given key pair can only be decrypted by the private key of the same key pair. The private key may also be used to create a digital signature for a message or other data that can be processed using the corresponding public key to verify that the message originated with the holder of the private key. In contrast, in symmetric cryptography, a single key is used for purposes of both encryption and decryption.

Some existing systems have used a "master encryption key" to encrypt highly sensitive data, such as other cryptographic keys. In order to protect the sensitive data encrypted by a master encryption key, the master encryption key itself must be securely and privately maintained. Otherwise, the security of the sensitive data stored in individual devices and/or across an entire distributed system may be compromised.

SUMMARY

Previous approaches to protecting highly sensitive data using a master encryption key have employed master encryption key splitting based on a (k, n) threshold scheme, in which a master encryption key (MEK) is split into n key shares MEK1, . . . MEKn such that (i) possession of any k or more key shares allows reconstruction of the master encryption key, and (ii) the master encryption key cannot be determined based on k–1 or fewer key shares. An example of such a threshold scheme is described in "How to Share a Secret" by Adi Shamir, Communications of the ACM, November 1979, Volume 22, Number 11. However, while such threshold schemes are typically scalable, they are very complex for most software developers to implement. As a result, approaches to protecting sensitive data based on such threshold schemes are likely to have bugs and/or design flaws that make them vulnerable to attack.

Additionally, it is sometimes desirable to apply different access control protocols when granting access to sensitive data stored on a client device, depending on whether the device is operating online or offline. For example, in the case where the sensitive data securely stored on a client device is a key that enables access to other data, some of which locally stored on the device itself, and some of which is located remotely. Since the locally stored and remotely stored data may have different levels of sensitivity, it may be desirable to employ one level of access control when granting access to the sensitive data/key when the device is online, and another level of access control when granting access to the sensitive data/key when the device is offline.

To address these and other shortcomings of previous solutions, a system is disclosed for protecting sensitive data on a client device, such as a mobile computing device, that encrypts the sensitive data using a private key, and that then encrypts the private key by i) generating a first (or "offline") encrypted version of the private key by using a first (or "offline") master key to encrypt the private key, and ii) generating a second (or "online") encrypted version of the private key by using an second (or "online") master key to encrypt the private key. The disclosed system then splits the first master key into multiple shares, including a user input key share derived from user authentication input data, and splits the second master key into multiple shares including a remote key share. The remote key share is transmitted from the device to a remote server, the first and second encrypted versions of the private key are persistently stored on the device, and the first master key and second master key are destroyed.

When requests to access the sensitive data are received, the disclosed system processes each request by initially determining whether the device is online. Processing of the requests further includes, in response to determining, for a first one of the requests, that the device is offline at the time at which the first one of the requests is received, reconstructing the first master key based at least in part on the user input key share, obtaining the private key by decrypting the first encrypted version of the private key using the first master key, and obtaining the sensitive data by decrypting the encrypted sensitive data using the private key. Processing of the requests further includes, in response to determining, for a second one of the access requests, that the device is online at the time the second one of the requests is received, reconstructing the second master key based at least in part on the remote key share, obtaining the private key by decrypting the second encrypted version of the private key using the second master key, and obtaining the sensitive data by decrypting the encrypted sensitive data using the private key.

In another aspect of the disclosed system, splitting the second master key may include generating a local key share that is the output of an exclusive-OR (XOR) operation performed on the user input key share and the first master key.

In another aspect of the disclosed system, reconstructing the first master key using the user input key share may include setting the first master key to an output of an exclusive-OR (XOR) operation performed on the user input key share and the local key share.

In another aspect of the disclosed system, splitting the second master key may include generating the remote key share as an output of an exclusive-OR (XOR) operation performed on the local key share and the second master key.

In another aspect of the disclosed system, reconstructing the second master key using the remote key share may include performing an authentication operation with the remote server to obtain the remote key share, and setting the second master key to an output of an exclusive-OR (XOR) operation performed on the local key share and the remote key share.

In another aspect of the disclosed system, the private key is part of a content protection key pair generated for the device, and the content protection key pair further includes a public key that is transmitted from the device to the remote server.

In another aspect of the disclosed system, splitting the first master key into a plurality of shares may include generating the user input key share as an output of a transformation function such as a cryptographic collision resistant hash function or an appropriate key derivation function applied to a password of a user authorized to use the device, and reconstructing the first master key may include generating the user input key share by applying the same function to password information received through a user interface of the device from a current user of the device.

In another aspect of the disclosed system, an online local key share may be a randomly generated symmetric encryption key, and splitting the first master key may include generating an offline local key share that is the output of an exclusive-OR (XOR) operation performed on the user input key share and the first master key. Splitting the second master key may include generating the remote key share as an output of an exclusive-OR (XOR) operation performed on the second master key and the online local key share.

Reconstructing the second master key may include performing an authentication operation with the remote server to obtain the remote key share and setting the second master key to an output of an exclusive-OR (XOR) operation performed on the online local key share and the remote key share, and reconstructing the first master key includes setting the first master key to an output of an exclusive-OR (XOR) operation performed on the remote key share and the offline local key share.

In an embodiment in which two different local key shares are generated, one for handling requests to access the sensitive data when the device is offline (i.e. an offline local key share), and one for handling requests to access the sensitive data when the device is online (i.e. an online local key share), different access control protocols may be used to control access to the two local key shares. For example, more rigorous authentication techniques may be applied when a user seeks to access the sensitive data when the device is online than when the device is offline.

Embodiments of the disclosed system may provide significant advantages over previous technologies. Embodiments of the disclosed system may, for example, avoid the complexities concomitant with previous approaches that use a (k,n) threshold scheme to provide key splitting. Accordingly, embodiments of the disclosed system may be less likely to have bugs and/or design flaws that make them vulnerable to attack.

Additionally, the disclosed system may be embodied to apply different access control protocols when granting access to different local key shares that are needed to access sensitive data stored on a client device, depending on whether the device is operating online or offline.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
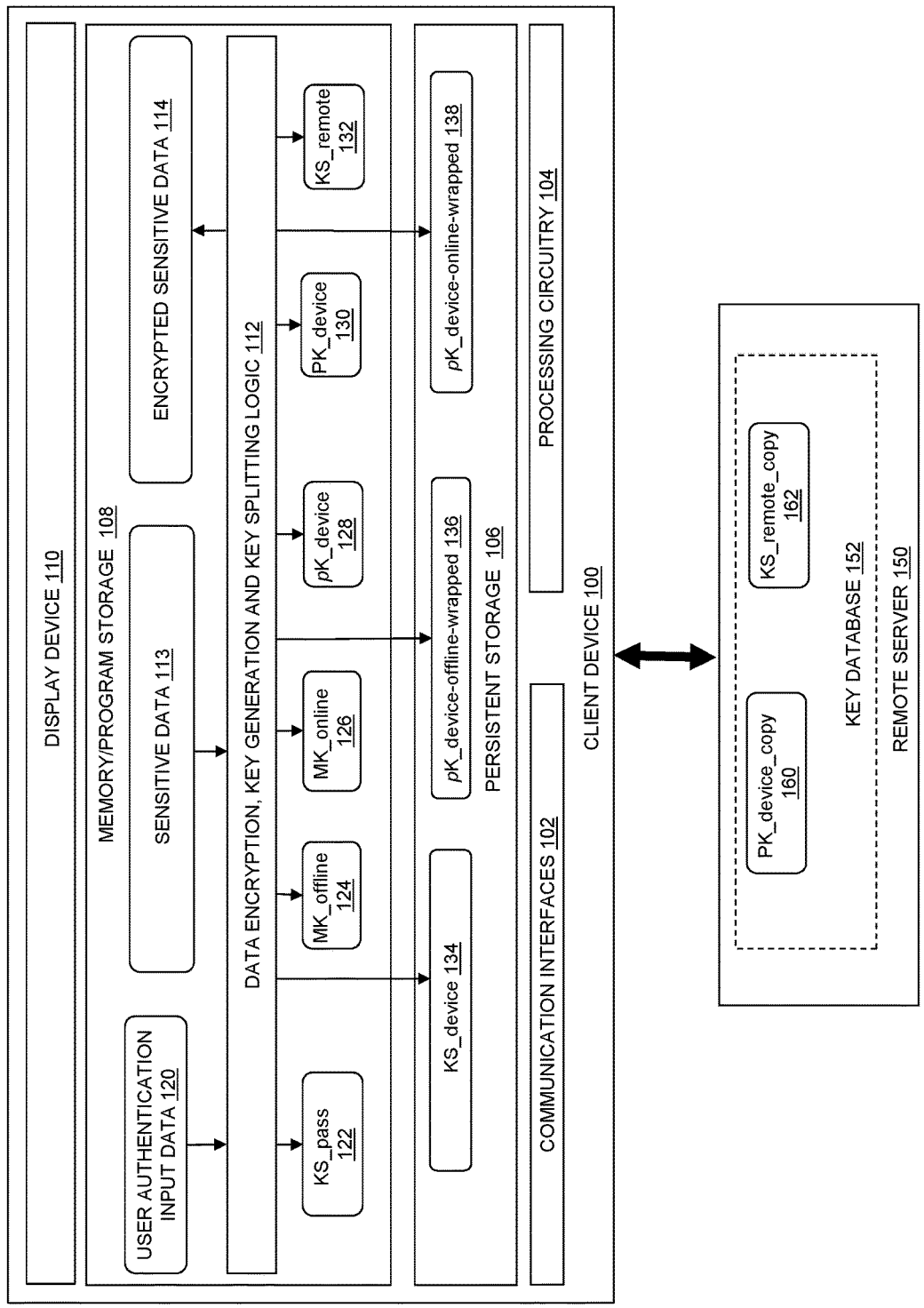
FIG. 1 is a block diagram showing components for encrypting sensitive data, and for generating and splitting master encryption keys in an illustrative embodiment of the disclosed system.

FIG. 1 is a block diagram showing components for encrypting sensitive data, and for generating and splitting master encryption keys in an illustrative embodiment of the disclosed system. As shown in FIG. 1, a Client Device 100 includes Communication Interfaces 102, Processing Circuitry 104, Persistent Storage 106, Memory/Program Storage 108, and a Display Device 110. Display Device 110 may include or consist of any specific type of output device operable to present information in visual form, such as a liquid crystal display (LCD) or other type of electronic visual display. Communication Interfaces 102 may, for example, include or consist of one or more network interface cards (NICs) or the like. Processing Circuitry 104 may, for example, include or consist of one or more single or multicore microprocessor computing components or the like and other associated processing circuitry. Persistent Storage 106 may, for example, include or consist of any specific type of non-volatile computer memory and/or other storage that can retrieve stored information even after having been power cycled, such as magnetic computer storage (e.g. a hard disk drive), and/or flash memory. Memory/Program Storage 108 may, for example, include or consist of any specific type of volatile or non-volatile semiconductor computer memory and/or other program storage that is operable to store programs (sequences of instructions) and/or data (e.g. program inputs, program outputs, program state information, etc.), for use in the Client Device 100.

Also shown in FIG. 1 is a remote server computer system, Remote Server 150. Remote Server 150 is operable, at least in part, to store and provide authenticated access to one or more encryption keys. For example, Remote Server 150 is shown to include a Key Database 152 for storing a number of encryption keys that may be transmitted to Remote Server 150 from the Client Device 100, and subsequently obtained by Client Device 100 from Remote Server 150 upon successful authentication of Client Device 100 and/or of a current user of Client Device 100 to Remote Server 150. Remote Server 150 and Client Device 100 may be communicably coupled through any specific type of communication network and/or computer network that allows computers and other electronic devices to exchange data, such as one or more Local Area Networks (LANs), Wireless Local Area Networks (WLANs), and/or Wide Area Networks (WANs), e.g. the Internet, and/or any other specific type of network.

In the Client Device 100 of FIG. 1, Data Encryption, Key Generation and Key Splitting Logic 112 operates to secure and control access to sensitive data. Data Encryption, Key Generation and Key Splitting Logic 112 may be embodied in whole or in part using program code that is executed on the Processing Circuitry 104, and/or using some combination of executable program code and hardware circuitry and/or firmware also provided in Client Device 100. Data Encryption, Key Generation and Key Splitting Logic 112 may further be embodied using some portion of operating system or utility software. For example, Data Encryption, Key Generation and Key Splitting Logic 112 may include client program code stored in the Memory/Program Storage 108 for execution on the Processing Circuitry 104, such as client program code that, when executed on Processing Circuitry 104, secures and controls access to sensitive data.

Figure 2:
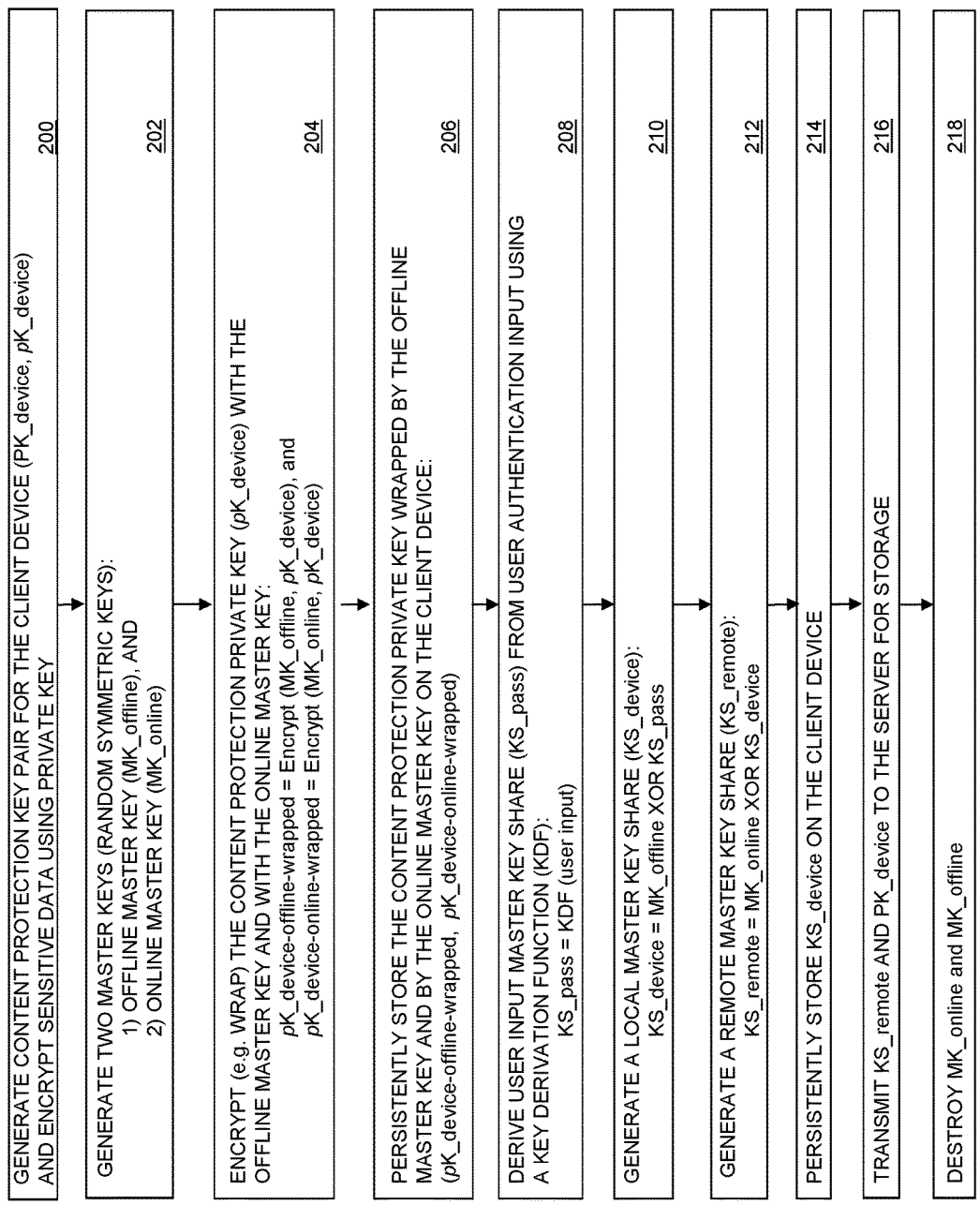
FIG. 2 is a flow chart showing steps performed by an illustrative embodiment of the disclosed system to encrypt sensitive data, and to generate and split master encryption keys.

An example of steps performed during the operation of Client Device 100 in one embodiment of the disclosed system in order to encrypt sensitive data, and to generate and split master encryption keys, is now described with additional reference to the steps shown in the flow chart of FIG. 2. The steps shown in FIG. 2 may, for example, be performed in whole or in part by the Data Encryption, Key Generation and Key Splitting Logic 112 shown in FIG. 1.

At step 200 of FIG. 2, the disclosed system generates a content protection key pair for the client device, shown for purposes of illustration in FIG. 1 by a private key pK_device 128 for the Client Device 100, and by a public key PK_device 130 for the Client Device 100. Further in step 200, the disclosed system encrypts the Sensitive Data 113 shown in FIG. 1 to generate Encrypted Sensitive Data 114, such that Sensitive Data 113 can only be recovered from Encrypted Sensitive Data 114 by decrypting Encrypted Sensitive Data 114 using the private keypK_device 128. For example, the Sensitive Data 113 may be encrypted at step 200 using the public key PK_device 130. The original unencrypted Sensitive Data 113 stored on Client Device 100 may then be destroyed. The Sensitive Data 113 that is encrypted at step 200 may include any specific type of data, including but not limited to, a number of cryptographic keys, authentication tokens or the like required to access protected data and/or services stored or otherwise located on the Client Device 100 and/or on one or more remotely located computer systems.

At step 202 of FIG. 2, the disclosed system generates two master encryption keys, e.g. a first master key and a second master key. The first master key generated at step 202 may be used and/or referred to herein as an "offline" master key, while the second master key generated at step 202 may be used and/or referred to herein as an "online" master key. For example, at step 202 the disclosed system may generate a first master key MK_offline 124, and a second master key MK_online 126, as shown in FIG. 1. The master keys generated at step 202 may, for example, be randomly generated symmetric encryption keys.

At step 204 of FIG. 2 the disclosed system uses each of the master keys generated in step 202 to encrypt the private key that is needed to decrypt the Encrypted Sensitive Data 113 shown in FIG. 1. For example, at step 204 the disclosed system creates a first or "offline" encrypted version of pK_device 128 by using the first master encryption key (i.e. MK_offline 124) to encrypt pK_device 128. The first encrypted version of pK_device 128 is shown in FIG. 1 as pK_device-offline-wrapped 136. Also at step 204 the disclosed system creates a second or "online" encrypted version of pK_device 128 by using the second master encryption key (i.e. MK_online 126) to encrypt pK_device 128. The second encrypted version of pK_device 128 is shown in FIG. 1 as pK_device-online-wrapped 138. For example, the encrypting of pK_device 128 performed at step 204 using MK_offline 124 and MK_online 126 to create pK_device-offline-wrapped 136 and pK_device-online-wrapped 138 respectively may be embodied in whole or in part using one or more symmetric encryption operations, such as key-wrapping or key encapsulation techniques. Examples of such techniques include those described in the Advanced Encryption Standard (AES) Key Wrap Specification, and/or in American Standards Committee ANSX9.102.

At step 206 of FIG. 2, the disclosed system persistently stores pK_device-offline-wrapped 136 and pK_device-online-wrapped 138, shown in FIG. 1 by pK_device-offline-wrapped 136 and pK_device-online-wrapped 138 being stored within Persistent Storage 106.

At step 208 of FIG. 2, the disclosed system derives a user input key share, shown in FIG. 1 by KS_pass 122, based on User Authentication Input Data 120. For example, the disclosed system may generate KS_pass 122 at step 208 by applying a key derivation function (KDF) to user authentication input data such as a password or the like for a user that is authorized to access Sensitive Data 113. Such user authentication input data for a specific user may, for example, be obtained from an authentication database or the like located on the Client Device 100 and/or on a remote server system. Any specific password or passphrase-based transformation function may be used at step 208 to create KS_pass 122, such as, for example, a cryptographic collision resistant hash function, or an appropriate key derivation function, such as the Password-Based Key Derivation Function 2 (PBKDF2), as published in Internet Engineering Task Force's RFC 2898.

In one embodiment, the result of applying the key derivation function to a user's password or the like may be further transformed to generate a value of KS_pass 122 having a byte size equal to that of KS_device 134 and KS_remote 132.

At step 210 of FIG. 2, the disclosed system generates a local key share, shown in FIG. 1 by KS_device 134. As shown in FIG. 2, at step 210 the disclosed system generates KS_device 134 by performing a bitwise exclusive-OR (XOR) operation on MK_offline 124 and KS_pass 122, and setting the value of KS_device 134 to the result of that logical operation. As shown in the preceding steps in FIG. 2, including steps 208 and 210, the disclosed system splits MK_offline 124 into multiple key shares from which MK_offline 124 can be reconstructed, including KS_pass 122 and KS_device 134.

At step 212 of FIG. 2, the disclosed system generates a remote key share, shown in FIG. 1 by KS_remote 132. As shown in FIG. 2, at step 212 the disclosed system generates KS_remote 132 by performing a bitwise exclusive-OR (XOR) operation on MK_online 126 and KS_device 134, and setting the value of KS_remote 132 to the result of that logical operation.

As shown in the preceding steps in FIG. 2, including step 212, the disclosed system splits MK_online 126 into multiple key shares from which MK_online 126 can be reconstructed, including KS_remote 132 and KS_device 134.

At step 214 of FIG. 2, the disclosed system persistently stores KS_device 134 on the client system, as shown in FIG. 1 by KS_device 134 being stored in Persistent Storage 106.

At step 216 of FIG. 2, the disclosed system transmits KS_remote 132 and PK_device 130 to a remote server for storage, shown in FIG. 1 by a copy of PK_device 130 stored in a Key Database 152 of Remote Server 150 (i.e. PK_device copy 160), and by a copy of KS_remote 132 also stored in Key Database 152 (i.e. KS_remote_copy 162).

At step 218, the disclosed system destroys MK_offline 124 and MK_online 126, for example by deleting all copies of MK_offline 124 and MK_online 126 from Client Device 100, e.g. from Memory/Program Storage 108.

Figure 3:
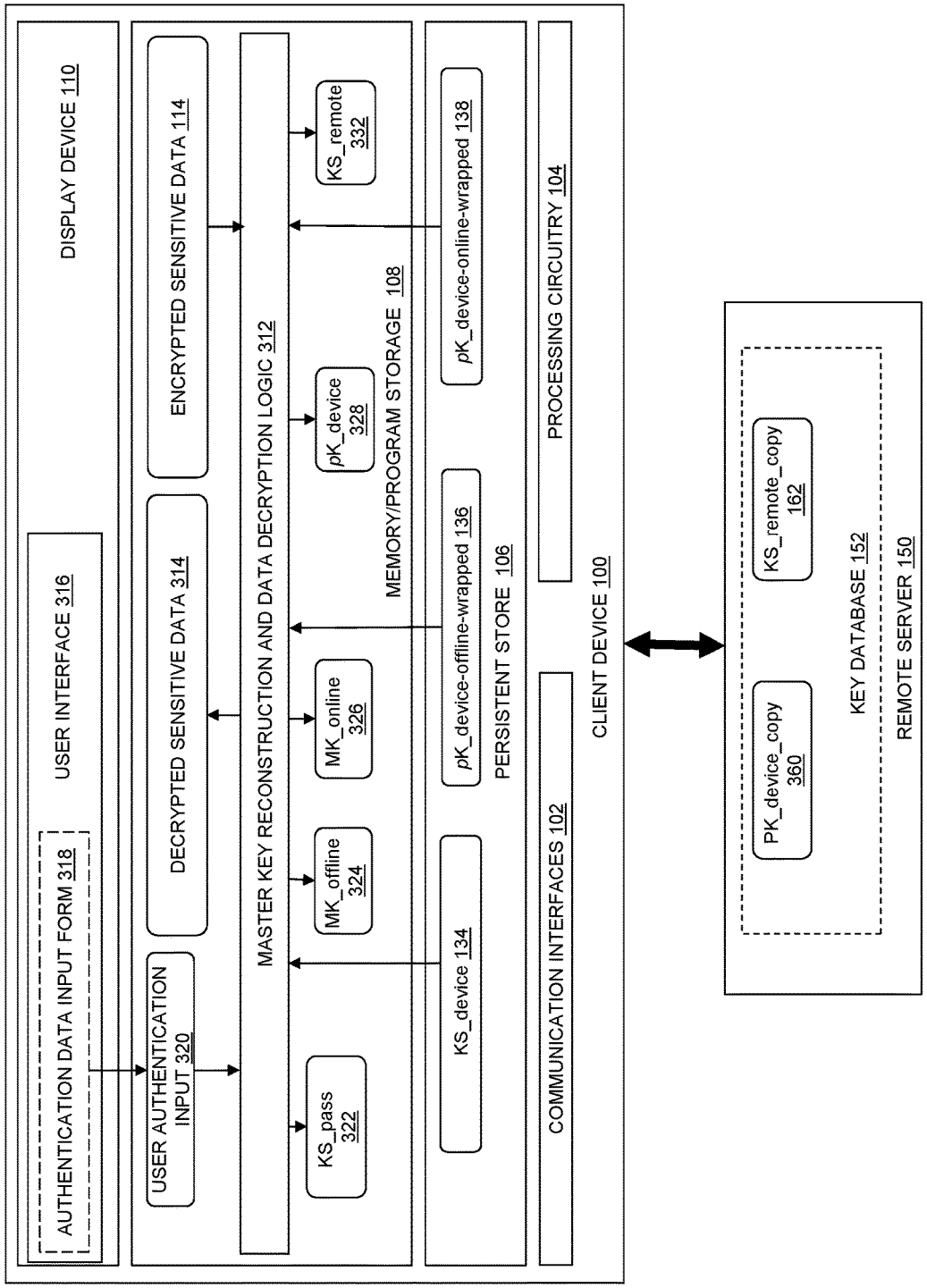
FIG. 3 is a block diagram showing components for reconstructing master encryption keys, and for decrypting previously encrypted sensitive data.

FIG. 3 is a block diagram showing components for reconstructing master encryption keys, and for decrypting previously encrypted sensitive data in an illustrative embodiment. As shown in FIG. 3, the Client Device 100 may further include Master Key Reconstruction and Data Decryption Logic 312 that operates to provide controlled access to sensitive data. Master Key Reconstruction and Data Decryption Logic 312 may be embodied in whole or in part using program code that is executed on the Processing Circuitry 104, and/or using some combination of executable program code and hardware circuitry and/or firmware provided in Client Device 100. Master Key Reconstruction and Data Decryption Logic 312 may further be embodied using some portion of operating system or utility software or the like. For example, Master Key Reconstruction and Data Decryption Logic 312 may include client program code stored in the Memory/Program Storage 108 for execution on the Processing Circuitry 104, such as client program code that, when executed on Processing Circuitry 104, may be used to control access to sensitive data.

Figure 4:
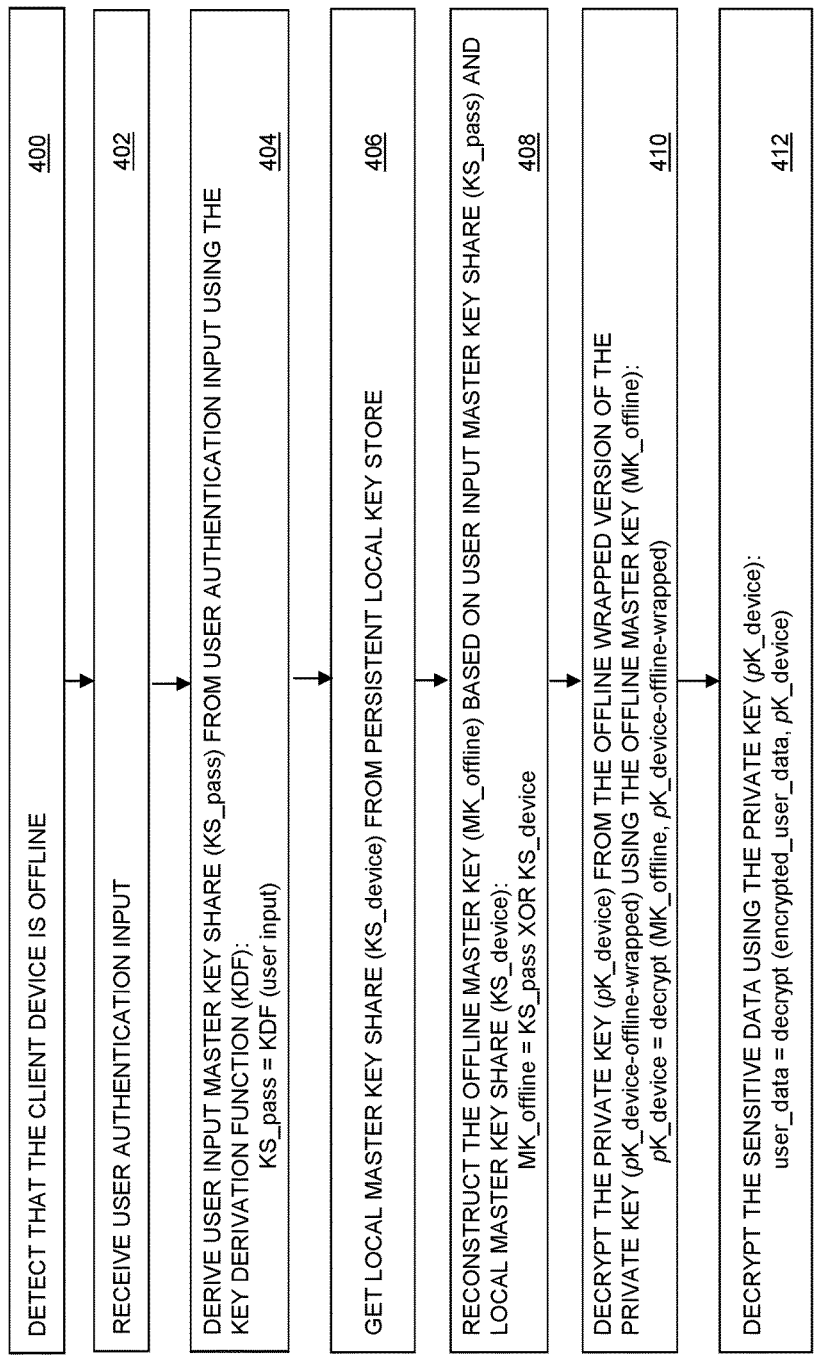
FIG. 4 is a flow chart showing steps performed by an illustrative embodiment when a device is offline for reconstructing a master encryption key and decrypting previously encrypted sensitive data.
Figure 5:
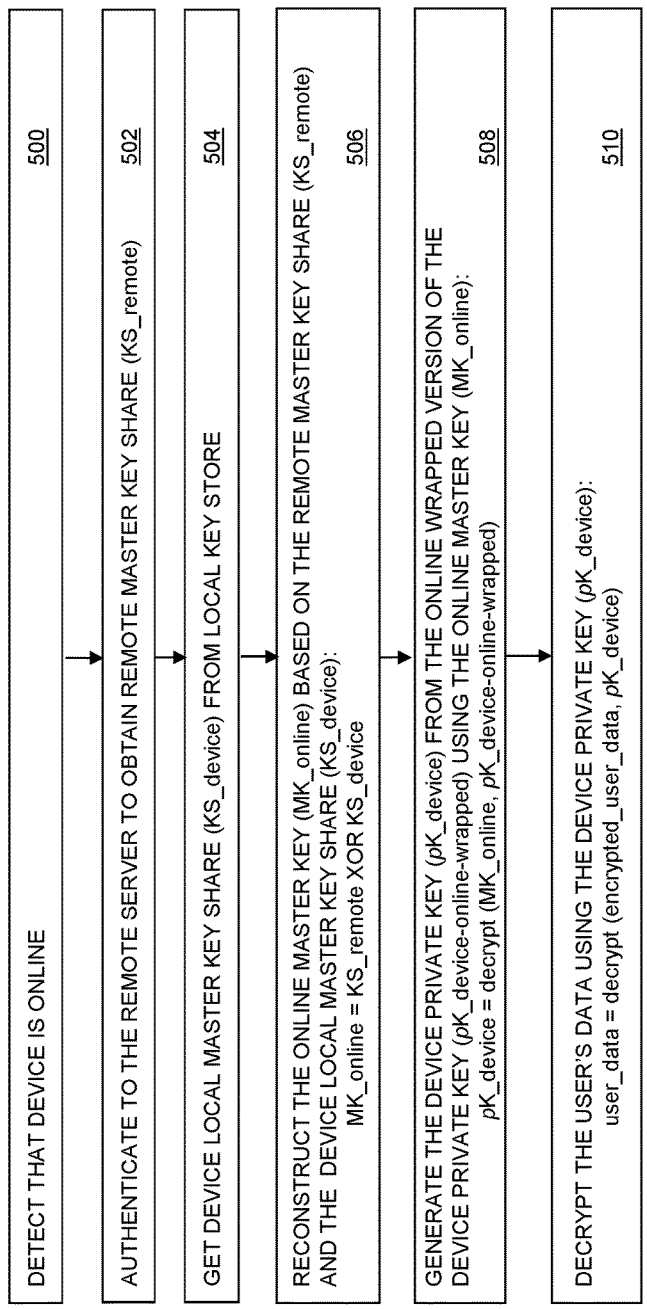
FIG. 5 is a flow chart showing steps performed by an illustrative embodiment when a device is online for reconstructing a master encryption key and decrypting previously encrypted sensitive data.

Examples of steps performed during the operation of Client Device 100 in one embodiment of the disclosed system to reconstruct master encryption keys and to provide access to previously encrypted sensitive data, is now described with additional reference to the steps shown in the flow charts of FIGS. 4 and 5. The steps shown in FIGS. 4 and 5 may, for example, be performed by the Master Key Reconstruction and Data Decryption Logic 312 shown in FIG. 3.

FIG. 4 is a flow chart showing steps performed by an illustrative embodiment, when a client device is offline, for reconstructing a master encryption key and decrypting previously encrypted sensitive data. At step 400, the disclosed system determines that the Client Device 100 is offline. For example, the disclosed system may determine that the Client Device 100 is offline at step 400 by determining that the Client Device 100 is not connected to a network. The remaining steps shown in FIG. 4 may all be performed in response to the determination at step 400 that the Client Device 100 is offline.

At step 402, the disclosed system receives some amount of user authentication input data from a current user of Client Device 100. The user authentication input data received at step 402 is required for the user to gain access to either the Client Device 100, and/or to data stored on the Client Device 100, and/or to one or more services that are available through or using the Client Device 100. For example, the authentication input data received from a current user of Client Device 100 in step 402 may include or consist of authentication data collected from the user by Client Device 100 using a variety of user gesture verification methods including Personal Identification Number (PIN) codes, passwords, biometrics, or using external tokens such as wearable devices. In one embodiment, the authentication data received from the user at step 402 may include authentication information entered into one or more forms displayed on Client Device 100, shown for purposes of illustration by Authentication Data Input Form 318 displayed within User Interface 316 on the Display Device 110 of Client 100. As further shown in FIG. 3, User Authentication Input 320 may be received through Authentication Data Input Form 318 and passed to Master Key Reconstruction and Data Decryption Logic 312.

At step 404, the disclosed system derives a user input key share, e.g. KS_pass 322 shown in FIG. 3, from the user authentication input received in step 402, e.g. User Authentication Input 320. For example, the disclosed system may apply a key derivation function to the User Authentication Input 320, such as the same key derivation function used in step 208 of FIG. 2 to generate KS_pass 122 shown in FIG. 1. As a result, in step 404 of FIG. 4, the Master Key Reconstruction and Data Encryption Logic 312 may generate KS_pass 322 that matches KS_pass 122 shown in FIG. 1.

At step 406 of FIG. 4, the disclosed system retrieves the local key share, shown in FIG. 3 by KS_device 134, from a persistent local key store, shown in FIG. 3 by Persistent Store 106.

At step 408 of FIG. 4, the disclosed system reconstructs the first or "offline" master key, e.g. MK_offline 324 in FIG. 3, based on the user input master key share, e.g. KS_pass 322 shown in FIG. 3, and the local master key share, e.g. KS_device 134 shown in FIG. 3. For example, in one embodiment, the disclosed system reconstructs MK_offline 324 at step 408 by performing a bitwise exclusive-OR (XOR) operation on KS_pass 322 and KS_device 134, and setting the value of MK_offline 324 to the result of that logical operation.

At step 410 of FIG. 4, the disclosed system decrypts the first or "offline" encrypted version of the private key, using the reconstructed first or "offline" master encryption key. For example, at step 410 of FIG. 4 the disclosed system decrypts pK_device-offline-wrapped 136 using MK_offline 324 to obtain pK_device 328.

At step 412 of FIG. 4, the disclosed system decrypts the encrypted sensitive data, e.g. Encrypted Sensitive Data 114 shown in FIG. 3, to obtain the Decrypted Sensitive Data 314. For example, at step 412 the disclosed system decrypts Encrypted Sensitive Data 114 using pK_device 328 to obtain Decrypted Sensitive Data 314. Decrypted Sensitive Data 314 may then be accessed or used by a user of the Client Device 100.

FIG. 5 is a flow chart showing steps performed by an illustrative embodiment, when a client device is online, for reconstructing a master encryption key and decrypting previously encrypted sensitive data. At step 500, the disclosed system determines that the Client Device 100 is online. For example, the disclosed system may determine that the Client Device 100 is online at step 500 by determining that the Client Device 100 is currently connected to a network. The remaining steps shown in FIG. 5 may all be performed in response to the determination at step 500 that the Client Device 100 is online.

At step 502, the Client Device 100 authenticates to a remote server, e.g. Remote Server 150. For example, at step 502 the Client Device 100 authenticates to the Remote Server 150 using asymmetric cryptography, combined with device identification and risk based authentication, in order to establish to Remote Server 150 that Client Device 100 and/or a current user of Client Device 100 is authorized to communicate with Remote Server 150 and/or access data or services provided by Remote Server 150. As a result of Client Device 100 and/or a current user of Client Device 100 successfully authenticating to Remote Server 150, Remote Server 150 issues Client Device 100 a transport level certificate for secure communication with the Remote Server 150. Further during the authentication process performed between the Client Device 100 and the Remote Server 150, Remote Server 150 transmits a copy of the remote key share for Client Device 100. For example, when the Client Device 100 successfully authenticates to Remote Server 150, Remote Server 150 transmits KS_Remote_copy 162 to Client Device 100. KS_Remote_copy 162 is a copy of KS_remote 132 shown in FIG. 1. In this way, Client Device 100 obtains a new copy of the previously generated remote key share from the remote server. The new copy of the remote key share is shown for purposes of illustration in FIG. 3 by KS_remote 332 stored in the Memory/Program Storage 108.

At step 504 of FIG. 5, the disclosed system retrieves the local master key share, shown in FIG. 3 by KS_device 134, as previously stored in a persistent local key store, an example of which is shown by Persistent Store 106.

At step 506 of FIG. 5, the disclosed system reconstructs the second or "online" master key. The reconstructed second or "online" master key is illustrated by MK_online 326 in FIG. 3. The reconstructed second or "online" master key MK_online 326 is reconstructed based on the remote key share, illustrated by KS_remote 332 shown in FIG. 3, and on the local master key share, illustrated by KS_device 134 shown in FIG. 3. For example, in one embodiment, the disclosed system reconstructs MK_online 326 at step 506 by performing a bitwise exclusive-OR (XOR) operation on KS_remote 332 and KS_device 134, and setting the value of MK_online 326 to the result of that logical operation.

At step 508 of FIG. 5, the disclosed system decrypts the second or "online" encrypted version of the private key, using the reconstructed second or "online" master encryption key. For example, at step 508 of FIG. 5, the disclosed system decrypts pK_device-online-wrapped 138 using MK_online 326 to obtain pK_device 328.

At step 510 of FIG. 5, the disclosed system decrypts the encrypted sensitive data, e.g. Encrypted Sensitive Data 114 shown in FIG. 3, to obtain the Decrypted Sensitive Data 314. For example, at step 510 the disclosed system decrypts Encrypted Sensitive Data 114 using pK_device 328 to obtain Decrypted Sensitive Data 314. Decrypted Sensitive Data 314 may then be accessed or used by a user of the Client Device 100.

Figure 6:
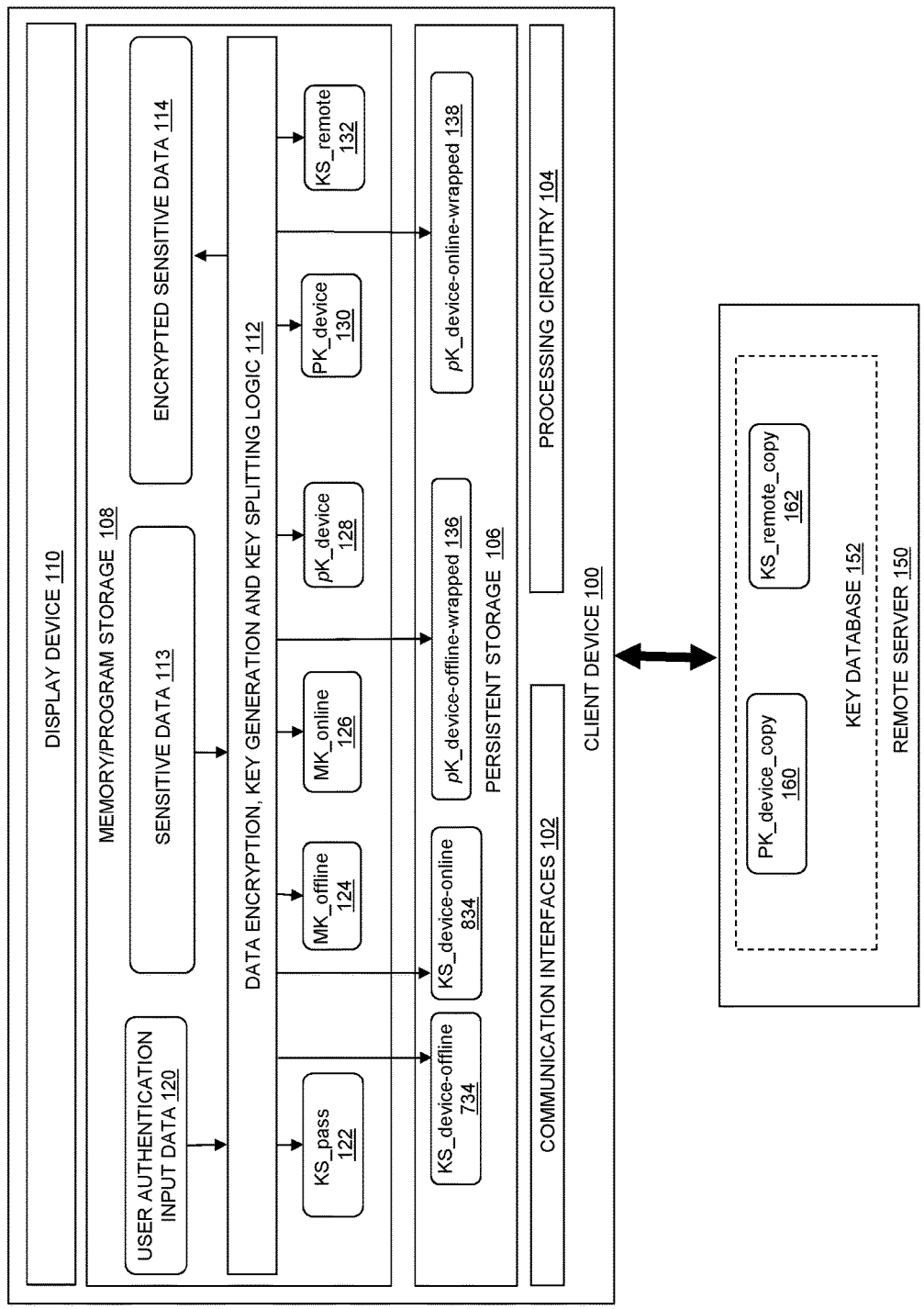
FIG. 6 is a block diagram showing components for encrypting sensitive data, and for generating and splitting master encryption keys in an alternative embodiment of the disclosed system, in which two different local key shares are generated, one for handling requests to access the sensitive data when the device is offline (i.e. an offline local key share), and one for handling requests to access the sensitive data when the device is online (i.e. an online local key share)

FIG. 6 is a block diagram showing components for encrypting sensitive data, and for generating and splitting master encryption keys in an alternative embodiment of the disclosed system, in which two different local key shares are generated, one for handling requests to access the sensitive data when the device is offline (i.e. an offline local key share), and one for handling requests to access the sensitive data when the device is online (i.e. an online local key share). The components in FIG. 6 correspond to the components of the embodiment shown in FIG. 1, except that Data Encryption, Key Generation and Key Splitting Logic 112 is operable to generate the offline local key share, shown as KS_device-offline 734, and the online local key share, shown as KS_device-online 834, as further described with reference to FIGS. 7-8.

Figure 7:
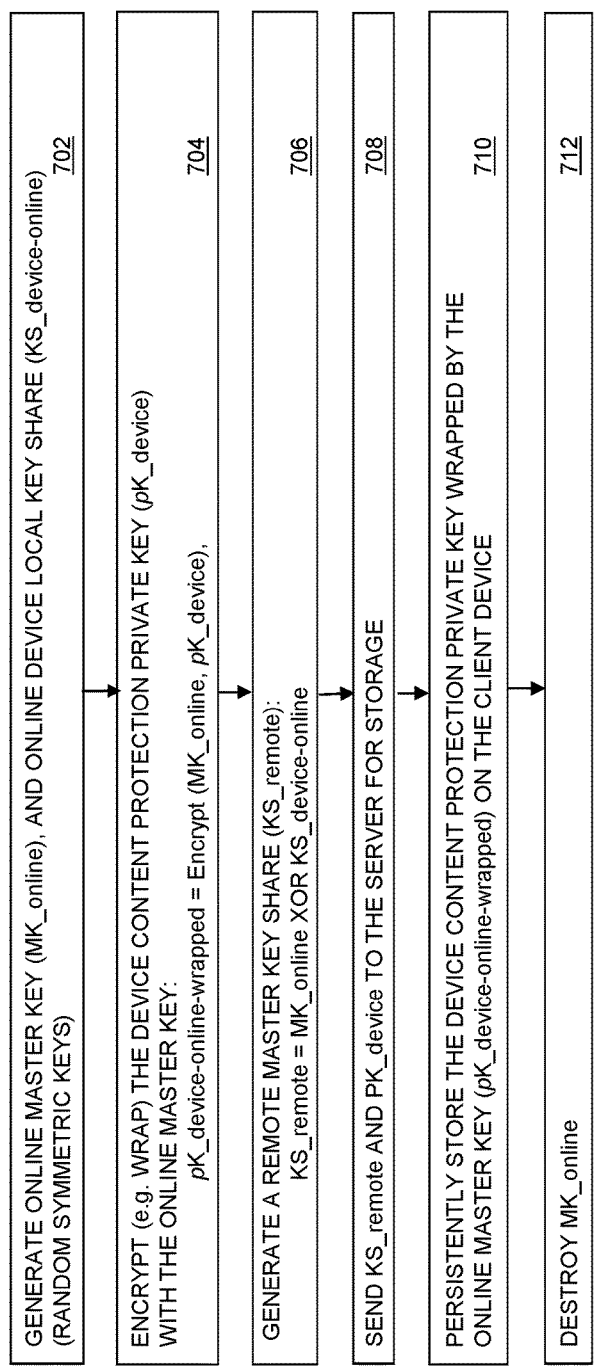
FIG. 7 is a flow chart showing a first set of steps performed by the alternative embodiment to encrypt sensitive data, and to generate and split master encryption keys.
Figure 8:
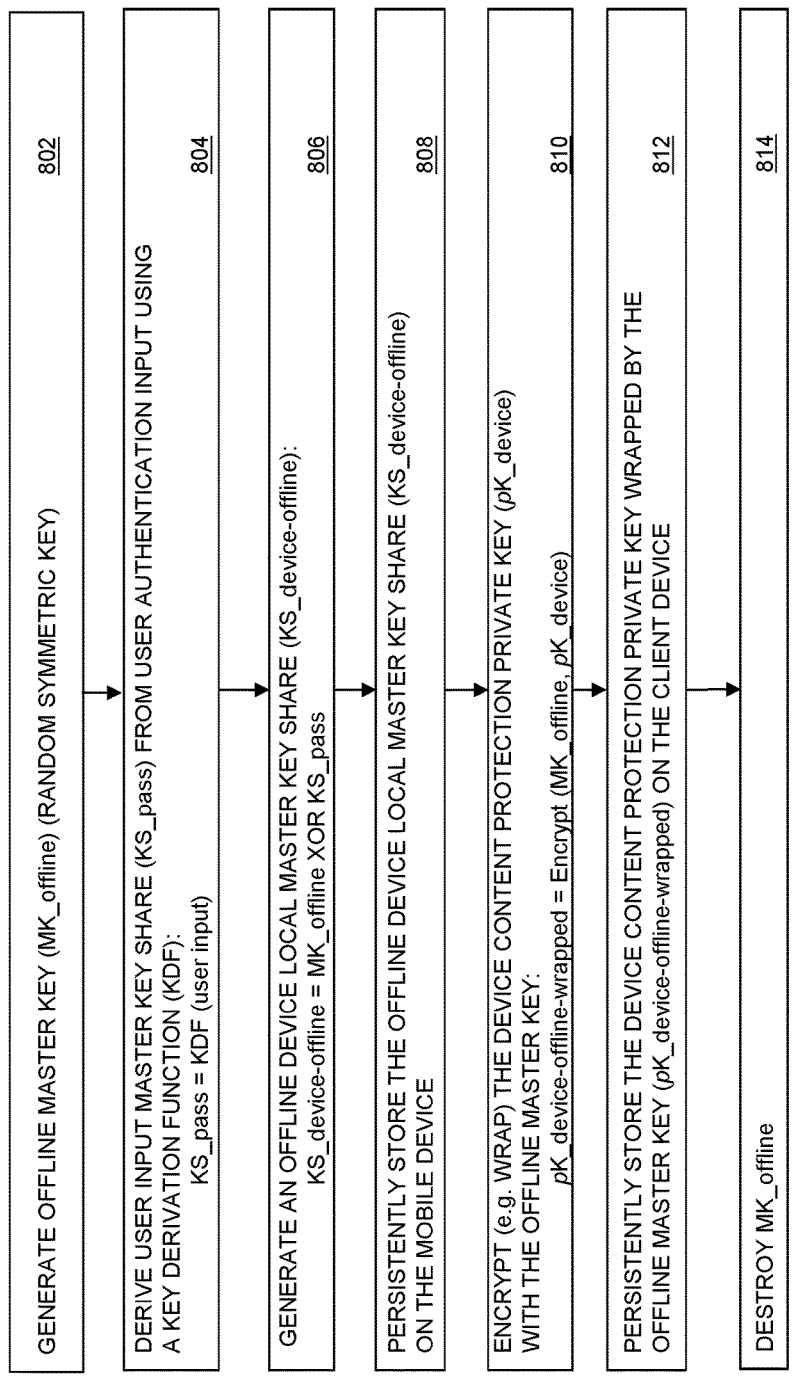
FIG. 8 is a flow chart showing a second set of steps performed by the alternative embodiment of to encrypt sensitive data, and to generate and split master encryption keys.

An example of steps performed during the operation of Client Device 100 in the alternative embodiment of the disclosed system, in order to encrypt sensitive data, and to generate and split master encryption keys, is now described with additional reference to the steps shown in the flow charts of FIGS. 7-8. The steps shown in FIGS. 7-8 may, for example, be performed in whole or in part by the alternative embodiment of the Data Encryption, Key Generation and Key Splitting Logic 112 shown in FIG. 6.

At step 702 of FIG. 7, the disclosed system generates an "online" master key, shown in FIG. 6 by MK_online 126. Further at step 702, the disclosed system generates an online local key share, shown in FIG. 6 as KS_device-online 834. MK_online 126 and KS_device-online 834 may, for example, be randomly generated symmetric encryption keys.

At step 704 of FIG. 7 the disclosed system uses the "online" master key generated in step 702 to encrypt the private key that is needed to decrypt the Encrypted Sensitive Data 113. For example, at step 704 the disclosed system creates an "online" encrypted version of pK_device 128 by using the online master encryption key (i.e. MK_online 126) to encrypt pK_device 128. The online encrypted version of pK_device 128 is shown in FIG. 6 as pK_device-online-wrapped 138.

At step 706 of FIG. 7, the disclosed system generates a remote key share, shown in FIG. 6 by KS_remote 132. As shown in FIG. 7, at step 706 the disclosed system generates KS_remote 132 by performing a bitwise exclusive-OR (XOR) operation on MK_online 126 and KS_device-online 834, and setting the value of KS_remote 132 to the result of that logical operation.

At step 708 of FIG. 7, the disclosed system transmits KS_remote 132 and PK_device 130 to a remote server for storage, shown in FIG. 6 by the copy of PK_device 130 stored in the Key Database 152 of Remote Server 150 (i.e. PK_device copy 160), and by the copy of KS_remote 132 also stored in Key Database 152 (i.e. KS_remote_copy 162).

At step 710, the disclosed system persistently stores pK_device-online-wrapped 138 within Persistent Storage 106.

At step 712, the disclosed system destroys MK_online 126 by deleting all copies of MK_online 126 from Client Device 100, e.g. from Memory/Program Storage 108.

Now with reference to FIG. 8, at step 802 the disclosed system generates an "offline" master key, shown in FIG. 6 by MK_offline 124. MK_offline 124 may, for example, be a randomly generated symmetric encryption key.

At step 804 of FIG. 8, the disclosed system derives a user input key share, shown in FIG. 6 by KS_pass 122, based on User Authentication Input Data 120. For example, the disclosed system may generate KS_pass 122 at step 208 by applying a key derivation function (KDF) to user authentication input data such as a password or the like for a user that is authorized to access Sensitive Data 113.

At step 806 of FIG. 8, the disclosed system generates an offline local key share, shown in FIG. 6 by KS_device-offline 734. For example, at step 806 the disclosed system generates KS_device-offline 734 by performing a bitwise exclusive-OR (XOR) operation on MK_offline 124 and KS_pass 122, and setting the value of KS_device-offline 734 to the result of that logical operation.

At step 808 of FIG. 8, the disclosed system persistently stores KS_device-offline 734 on the client system, as shown in FIG. 6 by KS_device-offline 734 being stored in Persistent Storage 106.

At step 810 of FIG. 8, the disclosed system uses the "offline" master key generated in step 802 to encrypt the private key that is needed to decrypt the Encrypted Sensitive Data 113. For example, at step 810 the disclosed system creates an "offline" encrypted version of pK_device 128 by using the offline master encryption key (i.e. MK_offline 124) to encrypt (e.g. wrap) pK_device 128. The offline encrypted version of pK_device 128 is shown in FIG. 6 as pK_device-offline-wrapped 136.

At step 812 of FIG. 8, the disclosed system persistently stores pK_device-offline-wrapped 136, as shown in FIG. 6 by pK_device-offline-wrapped 136 being stored in Persistent Storage 106.

At step 814 of FIG. 8, the disclosed system destroys MK_offline 124 by deleting all copies of MK_offline 124 from Client Device 100, e.g. from Memory/Program Storage 108.

Figure 9:
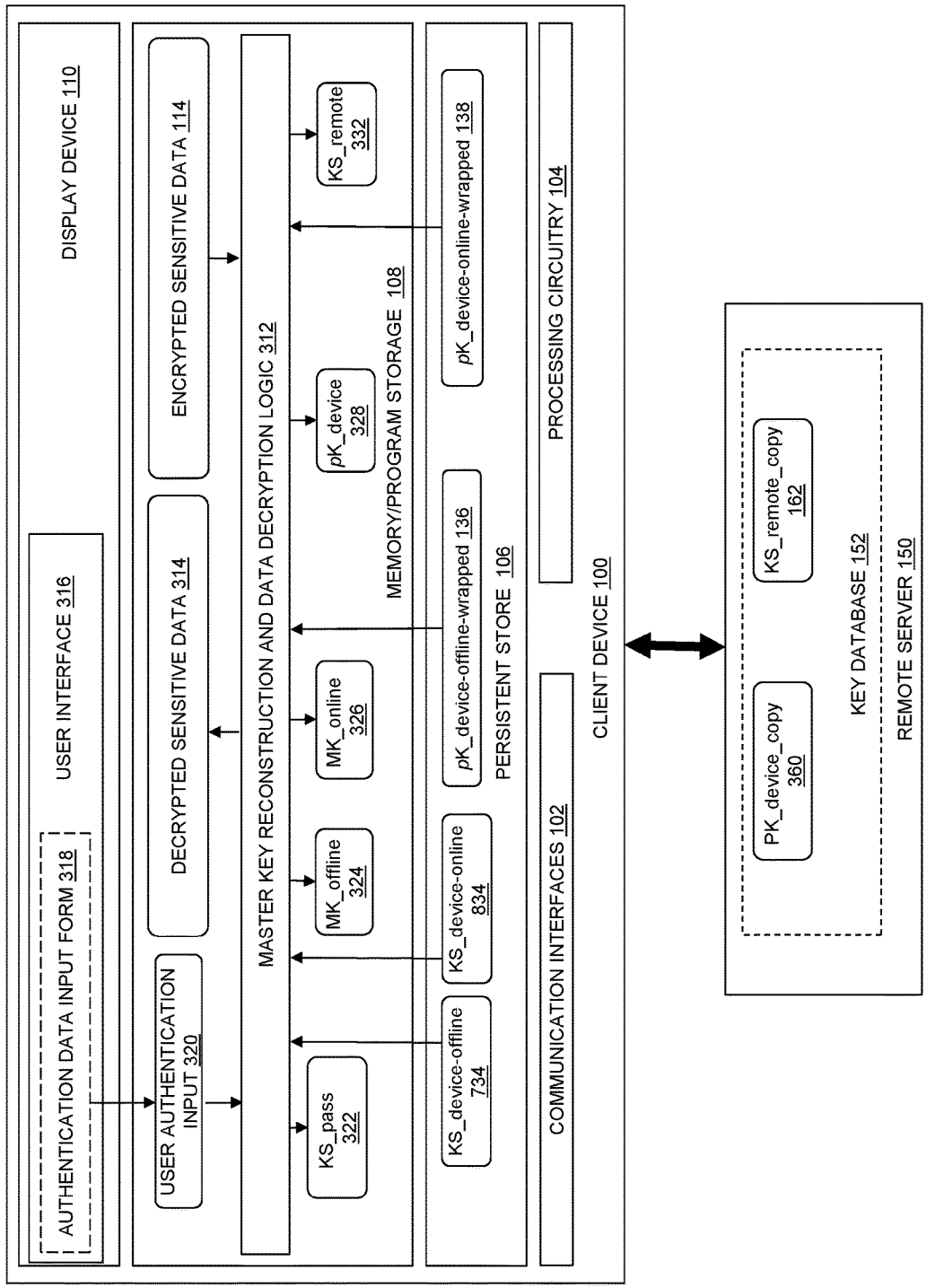
FIG. 9 is a is a block diagram showing components for reconstructing master encryption keys, and for decrypting previously encrypted sensitive data in the alternative embodiment.

FIG. 9 is a block diagram showing components for reconstructing master encryption keys, and for decrypting previously encrypted sensitive data in the alternative embodiment of FIGS. 6-8. In the alternative embodiment of FIG. 9, Master Key Reconstruction and Data Decryption Logic 312 operates to provide controlled access to sensitive data using, at different times, two different local key shares; one for handling requests to access the sensitive data when the device is offline (i.e. an offline local key share), and one for handling requests to access the sensitive data when the device is online (i.e. an online local key share). The components in FIG. 9 correspond to the components of the embodiment shown in FIG. 3, except that Master Key Reconstruction and Data Decryption Logic 312 is operable to allow access to the offline local key share (KS_device-offline 734) only in response to a user of the Client Device 100 successfully authenticating, when the device is offline, through a first access control protocol, and Master Key Reconstruction and Data Decryption Logic 312 is operable to allow access to the online local key share (KS_device-online 834) only in response to a user of the Client Device 100 successfully authenticating, when the device is online, through a second access control protocol.

Figure 10:
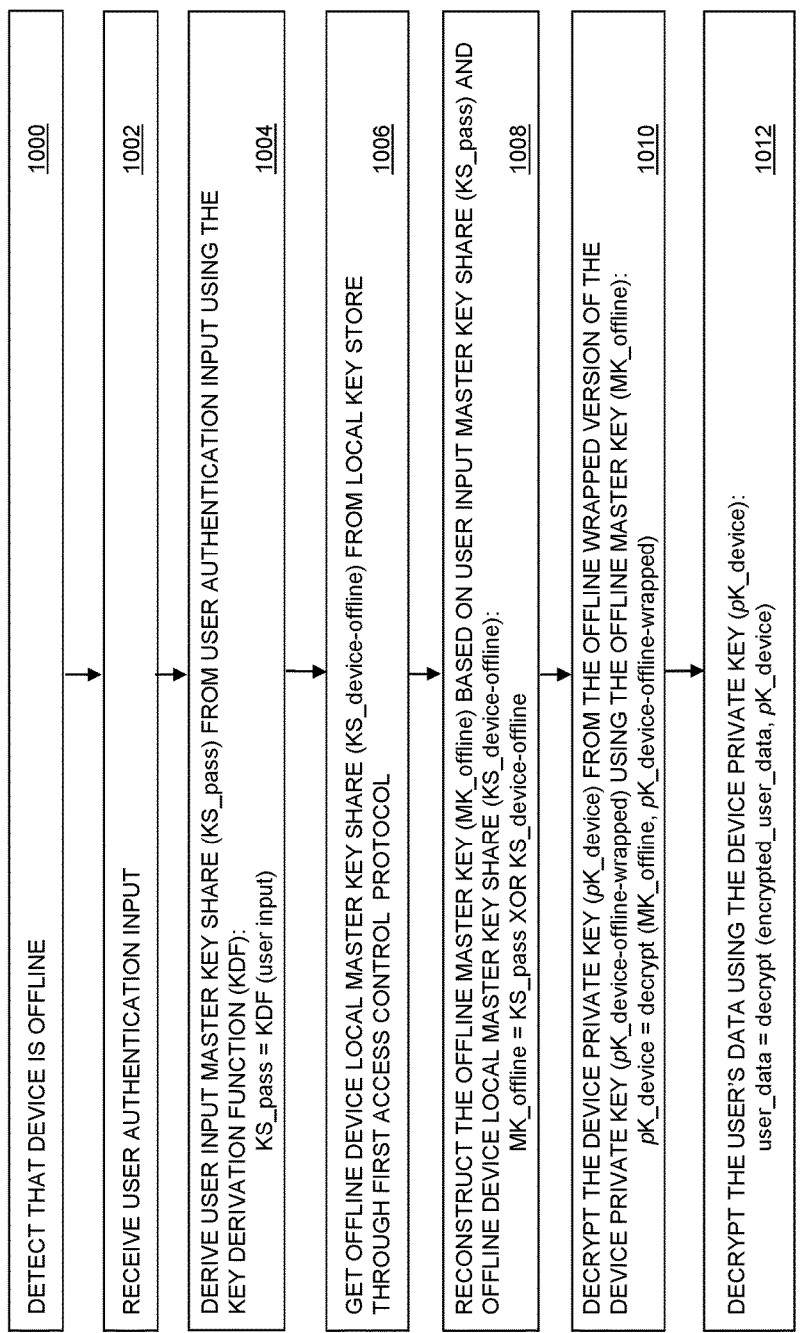
FIG. 10 is a flow chart showing steps performed by the alternative embodiment when a device is offline for reconstructing a master encryption key and decrypting previously encrypted sensitive data.
Figure 11:
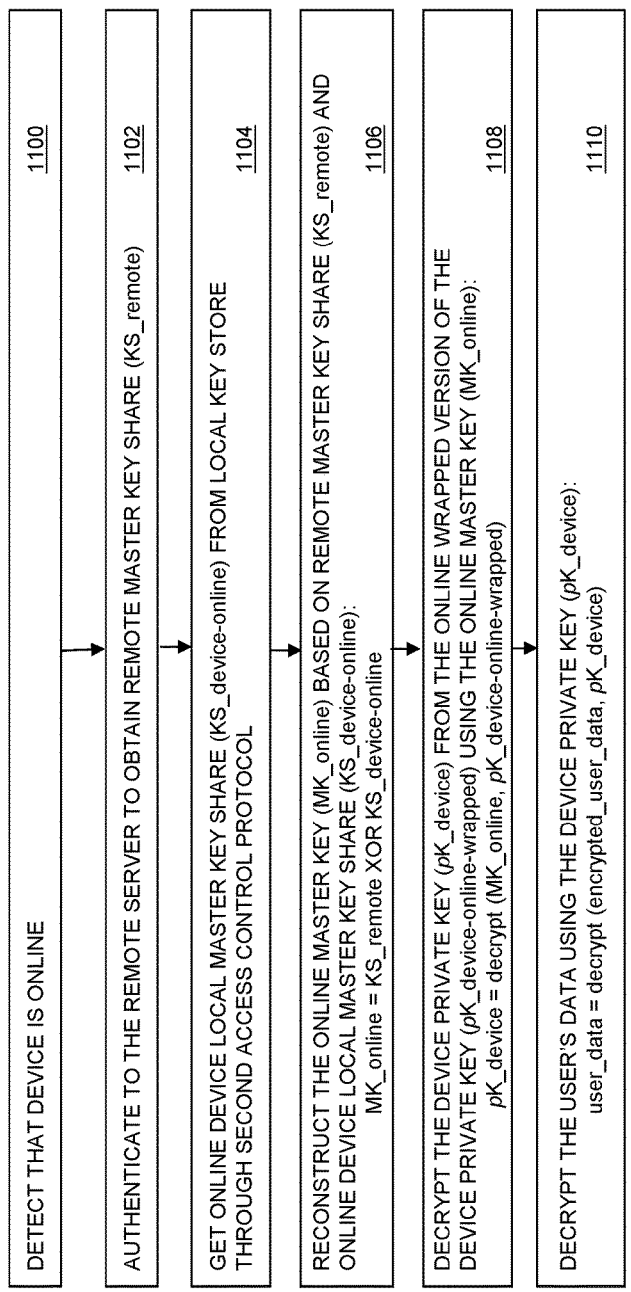
FIG. 11 is a flow chart showing steps performed by the alternative embodiment when a device is online for reconstructing a master encryption key and decrypting previously encrypted sensitive data.

Examples of steps performed during the operation of Client Device 100 in the alternative embodiment of FIGS. 6-9 to reconstruct master encryption keys and to provide access to previously encrypted sensitive data, are now described with additional reference to the steps shown in the flow charts of FIGS. 10 and 11. The steps shown in FIGS. 10 and 11 may, for example, be performed by the alternative embodiment of Master Key Reconstruction and Data Decryption Logic 312 shown in FIG. 9.

FIG. 10 is a flow chart showing steps performed by the alternative embodiment of FIGS. 6-9, when a client device is offline, to reconstruct a master encryption key and decrypt encrypted sensitive data. At step 1000, the disclosed system determines that the Client Device 100 is offline. For example, the disclosed system may determine that the Client Device 100 is offline at step 1000 by determining that the Client Device 100 is not connected to a network. The remaining steps shown in FIG. 10 may all be performed in response to the determination at step 1000 that the Client Device 100 is offline.

At step 1002, the disclosed system receives some amount of user authentication input data from a current user of Client Device 100. The user authentication input data received at step 402 is required for the user to gain access to either the Client Device 100, and/or to data stored on the Client Device 100, and/or to one or more services that are available through or using the Client Device 100. For example, the authentication input data received from a current user of Client Device 100 in step 1002 may include or consist of authentication data collected from the user by Client Device 100 using a variety of user gesture verification methods including Personal Identification Number (PIN) codes, passwords, biometrics, or using external tokens such as wearable devices. In one embodiment, the authentication data received from the user at step 1002 may include authentication information entered into one or more forms displayed on Client Device 100, shown for purposes of illustration by Authentication Data Input Form 318 displayed within User Interface 316 on the Display Device 110 of Client 100. As further shown in FIG. 9, User Authentication Input 320 may, for example, be received through Authentication Data Input Form 318 and passed to Master Key Reconstruction and Data Decryption Logic 312.

At step 1004, the disclosed system derives a user input key share, e.g. KS_pass 322 shown in FIG. 9, from the user authentication input received in step 1002, e.g. User Authentication Input 320. For example, the disclosed system may apply a key derivation function to the User Authentication Input 320, such as the same key derivation function used in step 804 of FIG. 8 to generate KS_pass 122 shown in FIG. 6. As a result, in step 1004 of FIG. 10, the Master Key Reconstruction and Data Encryption Logic 312 may generate KS_pass 322 shown in FIG. 9 that matches KS_pass 122 shown in FIG. 6.

At step 1006 of FIG. 10, the disclosed system retrieves the offline local key share, shown in FIG. 9 by KS_device-offline 734, from a persistent local key store, shown in FIG. 9 by Persistent Store 106. In the alternative embodiment of FIGS. 6-10, the Master Key Reconstruction and Data Decryption Logic 312 controls access to KS_device-offline 734 using a first access control protocol. The access control protocol enforced by Master Key Reconstruction and Data Decryption Logic 312 with regard access KS_device-offline 734 may, for example, be different from, e.g. less rigorous than, an access control protocol enforced with regard to gaining access to KS_device-online 834. For example, the access control protocol enforced by Master Key Reconstruction and Data Decryption Logic 312 with regard to accessing KS_device-offline 734 may require the user to enter or otherwise provide less user authentication information and/or go through fewer authentication stages than the access control protocol enforced by Master Key Reconstruction and Data Decryption Logic 312 with regard to KS_device-online 834. Accordingly, the access control protocol enforced by Master Key Reconstruction and Data Decryption Logic 312 with regard to accessing KS_device-offline 734 may require and verify fewer authentication factors from the user than the access control protocol enforced by Master Key Reconstruction and Data Decryption Logic 312 with regard to KS_device-online 834.

At step 1008 of FIG. 10, the disclosed system reconstructs the offline master key, e.g. MK_offline 324 in FIG. 9. For example, in the alternative embodiment of FIG. 10, the disclosed system may reconstruct MK_offline 324 based on the user input master key share, e.g. KS_pass 322 in FIG. 9, and the offline local key share, e.g. KS_device-offline 734 in FIG. 9. For example, the disclosed system may reconstruct MK_offline 324 at step 1008 by performing a bitwise exclusive-OR (XOR) operation on KS_pass 322 and KS_device-offline 734, and setting the value of MK_offline 324 to the result of that logical operation.

At step 1010 of FIG. 10, the disclosed system decrypts the offline encrypted version of the private key, using the reconstructed offline master encryption key. For example, at step 1010 of FIG. 10 the disclosed system decrypts pK_device-offline-wrapped 136 using MK_offline 324 to obtain pK_device 328.

At step 1012 of FIG. 10, the disclosed system decrypts the encrypted sensitive data, e.g. Encrypted Sensitive Data 114 shown in FIG. 3, to obtain the Decrypted Sensitive Data 314. For example, at step 1012 the disclosed system decrypts Encrypted Sensitive Data 114 using pK_device 328 to obtain Decrypted Sensitive Data 314. Decrypted Sensitive Data 314 may then be accessed or used by a user of the Client Device 100.

FIG. 11 is a flow chart showing steps performed by the alternative embodiment of FIGS. 6-10, when a device is online, to reconstruct a master encryption key and decrypt encrypted sensitive data. At step 1100, the disclosed system determines that the Client Device 100 is online. For example, the disclosed system may determine that the Client Device 100 is online at step 1100 by determining that the Client Device 100 is connected to a network. The remaining steps shown in FIG. 11 may all be performed in response to the determination at step 1100 that the Client Device 100 is online.

At step 1102, the Client Device 100 authenticates to a remote server, e.g. Remote Server 150. For example, at step 1102 the Client Device 100 authenticates to the Remote Server 150 using asymmetric cryptography, combined with device identification and risk based authentication, in order to establish to Remote Server 150 that Client Device 100 and/or a current user of Client Device 100 is authorized to communicate with Remote Server 150 and/or access data or services provided by Remote Server 150. As a result of Client Device 100 and/or a current user of Client Device 100 successfully authenticating to Remote Server 150, Remote Server 150 issues Client Device 100 a transport level certificate for secure communication with the Remote Server 150. Further during the authentication process performed between the Client Device 100 and the Remote Server 150, Remote Server 150 transmits a copy of the remote key share for Client Device 100. For example, when the Client Device 100 successfully authenticates to Remote Server 150, Remote Server 150 transmits KS_remote_copy 162 to Client Device 100. KS_remote_copy 162 is a copy of KS_remote 132 shown in FIG. 6. In this way, Client Device 100 obtains a new copy of the remote key share from the remote server. The new copy of the remote key share is shown for purposes of illustration in FIG. 9 by KS_remote 332 stored in the Memory/Program Storage 108.

At step 1104 of FIG. 11, the disclosed system retrieves the online local key share, shown in FIG. 9 by KS_device-online 834, as previously stored in a persistent local key store, an example of which is shown by Persistent Store 106. In the alternative embodiment of FIGS. 6-11, the Master Key Reconstruction and Data Decryption Logic 312 controls access to KS_device-online 834 using a second access control protocol. The access control protocol enforced by Master Key Reconstruction and Data Decryption Logic 312 with regard access KS_device-online 834 may, for example, be different from, e.g. more rigorous than, an access control protocol enforced with regard to gaining access to KS_device-offline 734. For example, the access control protocol enforced by Master Key Reconstruction and Data Decryption Logic 312 with regard to accessing KS_device-online 834 may require the user to enter or otherwise provide more user authentication information and/or go through more authentication stages than the access control protocol enforced by Master Key Reconstruction and Data Decryption Logic 312 with regard to KS_device-offline 734. Accordingly, the access control protocol enforced by Master Key Reconstruction and Data Decryption Logic 312 with regard to accessing KS_device-online 834 may require and verify more authentication factors from the user than the access control protocol enforced by Master Key Reconstruction and Data Decryption Logic 312 with regard to KS_device-offline 734. Such additional authentication factors required for access to KS_device-online 834 may, for example, include or consist of additional knowledge factors (e.g. one or more correct answers to a secret questions, etc.), possession factors (e.g. a token from a token generator, etc.), and/or any other specific additional authentication factors that may be appropriate for a specific operational context or deployment.

At step 1106 of FIG. 11, the disclosed system reconstructs the online master key. The reconstructed online master key is illustrated by MK_online 326 in FIG. 9. The reconstructed online master key MK_online 326 is reconstructed based on the remote key share, illustrated by KS_remote 332 shown in FIG. 9, and on the online local key share, illustrated by KS_device-online 834 shown in FIG. 3. For example, in one embodiment, the disclosed system reconstructs MK_online 326 at step 1106 by performing a bitwise exclusive-OR (XOR) operation on KS_remote 332 and KS_device-online 834, and setting the value of MK_online 326 to the result of that logical operation.

At step 1108 of FIG. 11, the disclosed system decrypts the online encrypted version of the private key, using the reconstructed online master encryption key. For example, at step 1108 of FIG. 11, the disclosed system decrypts pK_device-online-wrapped 138 using MK_online 326 to obtain pK_device 328.

At step 1110 of FIG. 11, the disclosed system decrypts the encrypted sensitive data, e.g. Encrypted Sensitive Data 114 shown in FIG. 9, to obtain the Decrypted Sensitive Data 314. For example, at step 1110 the disclosed system decrypts Encrypted Sensitive Data 114 using pK_device 328 to obtain Decrypted Sensitive Data 314. Decrypted Sensitive Data 314 may then be accessed or used by a user of the Client Device 100.

Those skilled in the art will recognize that the disclosed system is significantly more than merely the abstract idea of encrypting and decrypting data. Instead, the disclosed system addresses various specific shortcomings arising in previous technical solutions, including shortcomings arising from the complexity of using master encryption key splitting based on a (k, n) threshold scheme. In contrast to prior approaches to protecting sensitive data based on such threshold schemes, the disclosed system is less likely to have bugs and/or design flaws that would make it vulnerable to attack. The disclosed system also provides the ability to use different access control protocols when granting access to sensitive data stored on a client device, depending on whether the device is operating online or offline. Accordingly, the disclosed system may be effectively used to securely store sensitive data securely on a client device that includes a key that enables access to other data, some of which locally stored on the device itself, and some of which is located remotely. Since the locally stored and remotely stored data may have different levels of sensitivity, the disclosed system enables the use of one level of access control when granting access to the sensitive data/key when the device is online, and another, e.g. higher level of access control when granting access to the sensitive data/key when the device is offline.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of protecting sensitive data on a device, comprising executing, on at least one processor, the steps of:
   encrypting the sensitive data using a private key;
   encrypting the private key by i) generating a first encrypted version of the private key by using a first master key to encrypt the private key, and ii) generating a second encrypted version of the private key by using a second master key to encrypt the private key;
   splitting the first master key into a plurality of shares including a user input key share derived from user authentication input data;
   splitting the second master key into a plurality of shares including a remote key share and transmitting the remote key share from the device to a remote server;
   destroying the first master key and the second master key; and
   processing a plurality of requests to access the sensitive data subsequent to the first master key and the second master key being destroyed, by initially determining for each of the requests whether the device is online, and
      in response to determining, for a first one of the requests, that the device is offline, reconstructing the first master key using at least the user input key share, obtaining the private key by decrypting the first encrypted version of the private key using the first master key, and obtaining the sensitive data by decrypting the encrypted data using the private key, and
      in response to determining, for a second one of the access requests, that the device is online, reconstructing the second master key using at least the remote key share retrieved from the remote server, obtaining the private key by decrypting the second encrypted version of the private key using the second master key, and obtaining the sensitive data by decrypting the encrypted data using the private key.

2. The method of claim 1, wherein splitting the first master key includes generating a local key share as an output of an exclusive-OR (XOR) operation performed on the user input key share and the first master key.

3. The method of claim 2, wherein reconstructing the first master key using the user input key share includes setting the first master key to an output of an exclusive-OR (XOR) operation performed on the user input key share and the local key share.

4. The method of claim 2, wherein splitting the second master key includes generating the remote key share as an output of an exclusive-OR (XOR) operation performed on the local key share and the second master key.

5. The method of claim 4, wherein reconstructing the second master key using the remote key share includes performing an authentication operation with the remote server to obtain the remote key share and setting the second master key to an output of an exclusive-OR (XOR) operation performed on the local key share and the remote key share.

6. The method of claim 1, further comprising:
generating a content protection key pair for the device, wherein the content protection key pair includes the private key and a public key; and
transmitting the public key from the device to the remote server.

7. The method of claim 1, wherein splitting the first master key into a plurality of shares includes generating the user input key share as an output of a key derivation function applied to a password of a user authorized to use the device; and
wherein reconstructing the first master key includes generating the user input key share by applying the key derivation function to password information received from a user interface of the device.

8. The method of claim 1, further comprising:
generating an online local key share as a random symmetric encryption key;
wherein splitting the first master key includes generating an offline local key share as an output of an exclusive-OR (XOR) operation performed on the user input key share and the first master key;
wherein splitting the second master key includes generating the remote key share as an output of an exclusive-OR (XOR) operation performed on the second master key and the online local key share;
wherein reconstructing the second master key includes performing an authentication operation with the remote server to obtain the remote key share and setting the second master key to an output of an exclusive-OR (XOR) operation performed on the online local key share and the remote key share; and
wherein reconstructing the first master key includes setting the first master key to an output of an exclusive-OR (XOR) operation performed on the remote key share and the offline local key share.

9. A device, comprising:
at least one processor;
a memory having sensitive data and program code stored thereon, the program code for protecting the sensitive data, wherein the program code, when executed by the processor, causes the processor to
encrypt the sensitive data using a private key,
encrypt the private key by i) generating a first encrypted version of the private key by using a first master key to encrypt the private key, and ii) generating a second encrypted version of the private key by using a second master key to encrypt the private key,
split the first master key into a plurality of shares including a user input key share derived from user authentication input data,
split the second master key into a plurality of shares including a remote key share and transmitting the remote key share from the device to a remote server;
destroy the first master key and the second master key; and
process a plurality of requests to access the sensitive data subsequent to the first master key and the second master key being destroyed, by initially determining for each of the requests whether the device is online, and
in response to determining, for a first one of the requests, that the device is offline, reconstruct the first master key using at least the user input key share, obtaining the private key by decrypting the first encrypted version of the private key using the first master key, and obtaining the sensitive data by decrypting the encrypted data using the private key, and
in response to determining, for a second one of the access requests, that the device is online, reconstructing the second master key using at least the remote key share retrieved from the remote server, obtaining the private key by decrypting the second encrypted version of the private key using the second master key, and obtaining the sensitive data by decrypting the encrypted data using the private key.

10. The device of claim 9, wherein the program code, when executed by the processor, causes the processor to split the first master key by, at least in part, generating a local key share as an output of an exclusive-OR (XOR) operation performed on the user input key share and the first master key.

11. The device of claim 10, wherein the program code, when executed by the processor, causes the processor to reconstruct the first master key using the user input key share by, at least in part, setting the first master key to an output of an exclusive-OR (XOR) operation performed on the user input key share and the local key share.

12. The device of claim 10, wherein the program code, when executed by the processor, causes the processor to split the second master key by, at least in part, generating the remote key share as an output of an exclusive-OR (XOR) operation performed on the local key share and the second master key.

13. The device of claim 12, wherein the program code, when executed by the processor, causes the processor to reconstruct the second master key using the remote key share by, at least in part, performing an authentication operation with the remote server to obtain the remote key share and setting the second master key to an output of an exclusive-OR (XOR) operation performed on the local key share and the remote key share.

14. The device of claim 9, wherein the program code, when executed by the processor, further causes the processor to:
generate a content protection key pair for the device, wherein the content protection key pair includes the private key and a public key; and
transmit the public key from the device to the remote server.

15. The device of claim 9, wherein the program code, when executed by the processor, causes the processor to:
split the first master key into a plurality of shares by, at least in part, generating the user input key share as an output of a key derivation function applied to a password of a user authorized to use the device; and reconstruct the first master key by, at least in part, generating the user input key share by applying the key derivation function to password information received from a user interface of the device.

16. The device of claim 9, wherein the program code, when executed by the processor, further causes the processor to:
generate an online local key share as a random symmetric encryption key;
wherein the program code, when executed by the processor, causes the processor to split the first master key by, at least in part, generating an offline local key share as an output of an exclusive-OR (XOR) operation performed on the user input key share and the first master key;
wherein the program code, when executed by the processor, causes the processor to split the second master key by, at least in part, generating the remote key share as an output of an exclusive-OR (XOR) operation performed on the second master key and the online local key share;
wherein the program code, when executed by the processor, causes the processor to reconstruct the second master key by, at least in part, performing an authentication operation with the remote server to obtain the remote key share and setting the second master key to an output of an exclusive-OR (XOR) operation performed on the online local key share and the remote key share; and
wherein the program code, when executed by the processor, causes the processor to reconstruct the first master key by, at least in part, setting the first master key to an output of an exclusive-OR (XOR) operation performed on the remote key share and the offline local key share.

17. A non-transitory computer readable medium for protecting sensitive data on a device, comprising instructions stored thereon, that when executed on a processor, perform the steps of:
encrypting the sensitive data using a private key;
encrypting the private key by i) generating a first encrypted version of the private key by using a first master key to encrypt the private key, and ii) generating a second encrypted version of the private key by using a second master key to encrypt the private key;
splitting the first master key into a plurality of shares including a user input key share derived from user authentication input data;
splitting the second master key into a plurality of shares including a remote key share and transmitting the remote key share from the device to a remote server;
destroying the first master key and the second master key; and
processing a plurality of requests to access the sensitive data subsequent to the first master key and the second master key being destroyed, by initially determining for each of the requests whether the device is online, and
in response to determining, for a first one of the requests, that the device is offline, reconstructing the first master key using at least the user input key share, obtaining the private key by decrypting the first encrypted version of the private key using the first master key, and obtaining the sensitive data by decrypting the encrypted data using the private key, and
in response to determining, for a second one of the access requests, that the device is online, reconstructing the second master key using at least the remote key share retrieved from the remote server, obtaining the private key by decrypting the second encrypted version of the private key using the second master key, and obtaining the sensitive data by decrypting the encrypted data using the private key.

* * * * *